US010328840B2

(12) United States Patent
White et al.

(10) Patent No.: US 10,328,840 B2
(45) Date of Patent: Jun. 25, 2019

(54) CARGO STRAP TENSIONING AND MONITORING SYSTEM

(71) Applicant: Time Bandit, LLC, Batesville, AR (US)

(72) Inventors: Johnny White, Newport, AR (US); Lonny W. Rollins, San Luis Obispo, CA (US)

( * ) Notice: Subject to any disclaimer, the term of this patent is extended or adjusted under 35 U.S.C. 154(b) by 0 days.

(21) Appl. No.: 14/544,879

(22) Filed: Mar. 2, 2015

(65) Prior Publication Data
US 2017/0028901 A1 Feb. 2, 2017

Related U.S. Application Data

(60) Provisional application No. 61/946,549, filed on Feb. 28, 2014.

(51) Int. Cl.
| | | |
|---|---|---|
| *B60R 21/015* | (2006.01) | |
| *B60P 7/08* | (2006.01) | |
| *H04W 4/00* | (2018.01) | |
| *G01L 5/10* | (2006.01) | |
| *G01L 5/04* | (2006.01) | |

(52) U.S. Cl.
CPC ............. *B60P 7/0861* (2013.01); *G01L 5/04* (2013.01); *G01L 5/101* (2013.01); *H04W 4/005* (2013.01)

(58) Field of Classification Search
CPC .................................................. B60R 21/015
USPC ....................................................... 73/862.391
See application file for complete search history.

(56) References Cited

U.S. PATENT DOCUMENTS

| | | | | | |
|---|---|---|---|---|---|
| 4,420,755 A | * | 12/1983 | Primbs, Jr. | ............... | G01L 5/101 |
| | | | | | 212/278 |
| 4,461,459 A | * | 7/1984 | Conti | ...................... | G01L 5/101 |
| | | | | | 254/134.3 FT |
| 4,803,886 A | * | 2/1989 | May | ........................ | G01L 5/102 |
| | | | | | 340/870.38 |
| 4,977,784 A | * | 12/1990 | Eckerle | .................... | G01G 3/16 |
| | | | | | 177/136 |
| 6,370,971 B1 | * | 4/2002 | Olson | ................... | G01L 1/2225 |
| | | | | | 73/862.634 |

(Continued)

OTHER PUBLICATIONS

Patent Cooperation Treaty (PCT), Search Report, WO2015130407 PCT/US 15/00033, ISA, dated Mar. 2, 2015, 2 pages.*

(Continued)

*Primary Examiner* — Clayton E Laballe
*Assistant Examiner* — Kevin Butler
(74) *Attorney, Agent, or Firm* — IP Law Leaders PLLC

(57) ABSTRACT

A cargo strap monitoring system for real-time detection and reporting of cargo strap failure is provided. The cargo strap monitoring system may be a detector in the form of a cylinder that fits a winch slot. The cylinder provides a housing for circuitry operably linked to a pressure sensor. During normal operation a cargo strap is wrapped around and deployed from the spindle. The pressure sensor detects unsafe tension in the cargo strap. The circuitry includes a transceiver and a processor. Upon detection of an unsafe tension condition the transceiver transmits a warning to a remote monitor which may be located in a driver's truck cab. The remote monitor can be a mobile terminal such as a smart phone. The spindle with a slot and circuitry including the pressure sensor can be sold as a kit suitable for retrofitting to cargo strap winches.

7 Claims, 36 Drawing Sheets

(56) References Cited

U.S. PATENT DOCUMENTS

| | | | | |
|---|---|---|---|---|
| 7,112,023 B1* | 9/2006 | Tardif | ............... | B60P 7/0861 340/440 |
| 8,432,290 B2* | 4/2013 | Ruan | ............... | B60P 7/0861 340/665 |
| 2007/0269285 A1* | 11/2007 | Leggett | ............... | B60P 7/083 410/100 |
| 2008/0304932 A1* | 12/2008 | Leggett | ............... | B60P 7/083 410/100 |
| 2010/0158629 A1* | 6/2010 | Morland | ............ | B60P 7/0861 410/98 |
| 2011/0006899 A1* | 1/2011 | Eide | ............... | B60P 7/0861 340/568.1 |
| 2012/0260740 A1* | 10/2012 | Huguenot | ............ | B60P 7/0861 73/826 |
| 2013/0082925 A1* | 4/2013 | Sato | ............... | G06F 3/044 345/157 |
| 2013/0160254 A1* | 6/2013 | Stoddard | ............ | B60P 7/0861 24/68 CD |

OTHER PUBLICATIONS

Patent Cooperation Treaty (PCT), Written Opinion, WO2015130407 PCT/US 15/00033, ISA, dated Sep. 1, 2015, 9 pages.*

* cited by examiner

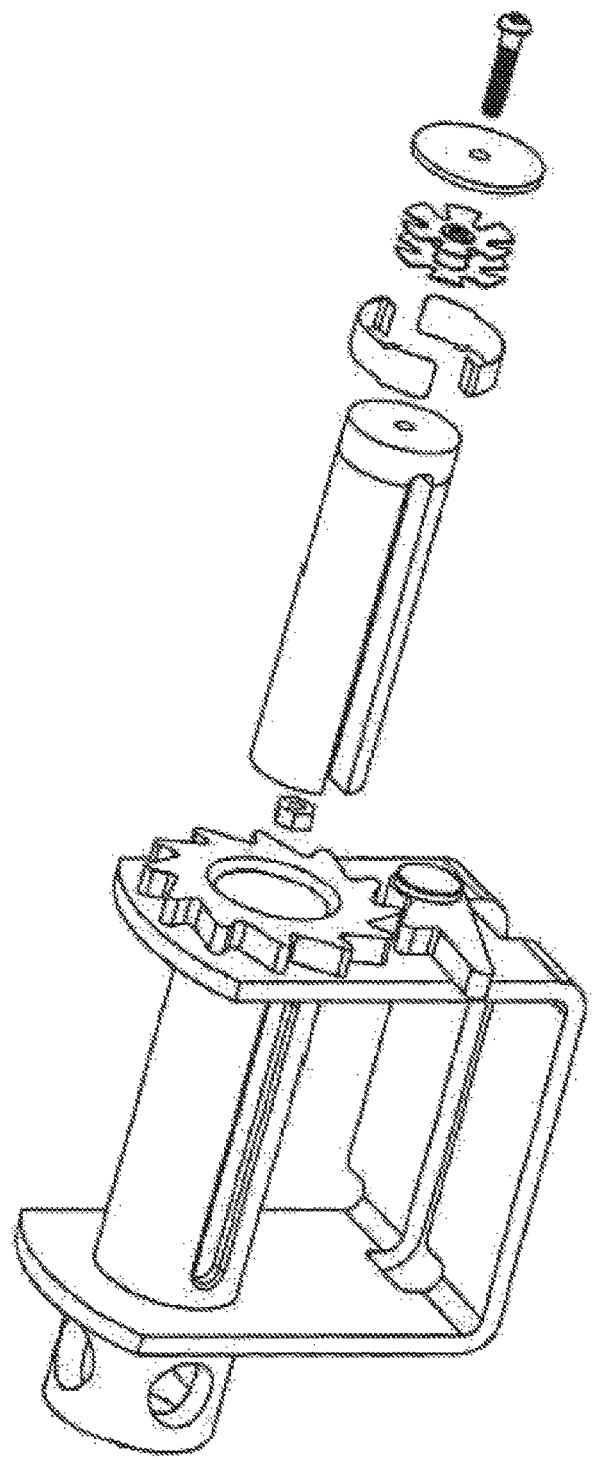

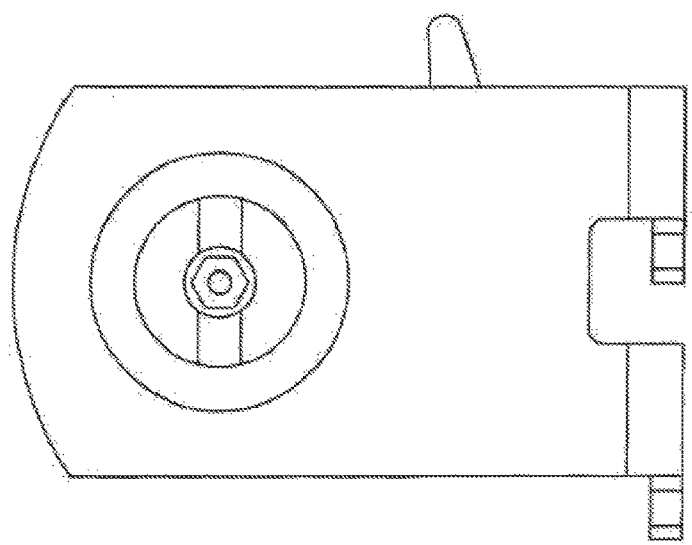

CARGO STRAP TENSIONING AND MONITORING SYSTEM

PRIORITY INFORMATION

The present application claims priority under 35 U.S.C. §119(e) to U.S. Provisional Patent Application Ser. No. 61/946,549, entitled "CARGO STRAP TENSIONING AND MONITORING SYSTEM," filed 28 Feb., 2014, the entire contents of which are expressly incorporated herein by reference.

TECHNICAL FIELD

The embodiments described herein relate to the transport of cargo aboard vehicles such as, but not limited to, flatbed trucks, boats, ships, and aircraft, among other types of cargo carrying vessels. More specifically, the embodiments relate to devices for tensioning and monitoring cargo straps used in the cargo transport industry.

BACKGROUND

U.S. Patent Application Publication No. 20120260740 describes a strap having one or more built-in sensors. The strap may be used, for example, in trucking, for securing loads inside a trailer or on the bed of a trailer. The sensors may wirelessly transmit tension data to a portable electronic device, such as a smart phone. This allows a user to monitor the tension on one or more straps without having to physically examine them. U.S. Pat. No. 7,972,099 describes a self-tensioning tie down assembly and safety system for tightening the retaining straps securing cargo on a carrier. Retaining straps are connected to winches connected to the carrier. A ratchet system is used to tighten the winch. A two bar torque linkage has a ratchet arm connectable to the ratchet wheel of the winch via a socket and has a connector arm connected to an actuator. The actuator is connected to a pneumatic/electrical circuit and provides reciprocating linear motion thereby actuating the torque linkage. The torque linkage may be set in a tightening or loosening position. The required tension level of the retaining strap is pre-set. Pressure within the circuit drives the actuator thereby actuating the torque linkage which tightens the strap on the winch until the tension level is reached. Signals are sent to a display panel to indicate when a strap is loose.

U.S. Pat. No. 8,432,290 describes a force measuring ratchet tie down system in the field of goods holding; more particularly the '290 device is said to address technical problems such as insufficiently tight binding, severe difficulty in control and trouble in adjustment. The force measuring ratchet tie down includes a body assembly, a handle, a teeth stop board, a catch and scroll. The handle is connected with the body assembly through the scroll. A binding belt having a fixable outer end is connected to the body assembly. Another binding belt having a fixable outer end is rolled on the scroll. A ratchet is fixed on the scroll. The body assembly is movably connected with a teeth stop board the end of which could be embedded among the teeth of the ratchet. The handle is movably connected with a catch the end of which could be embedded among the teeth of the ratchet. A sensor is placed at a forced part of the tie down, which is linked with a signal processing circuit and could generate a signal corresponding to the size of the tensioning force of the binding belt when the tie down is in operation. A display device is connected to the signal processing circuit. The force measuring ratchet tie down of the '290 Patent has alleged advantages that include a high safety property, a compact structure, and a low manufacturing cost.

Foreign Patent Application Publication Number EP1467193 describes a system for monitoring the position of a belt around an object, and comprises a belt unit with a force sensor for measuring the tension of a belt around an object, a transmitter for cable or wireless transmission of a tension measurement signal, and a power supply. A display unit is also included, and has a receiver for the tension measurement signal and a display device for optical and/or acoustic display of the tension information.

U.S. Pat. No. 7,112,023 describes a tension alert device that is attached between opposing ends of a securing member attached to a load bed to secure a load thereupon. The device has a strip with a curved portion, which is resiliently movable towards a proximity sensor disposed on a wall in device. When tension in securing member decreases, proximity of the curved portion relative wall decreases. When the curved portion enters a proximity actuation state relative to a first wall corresponding to a low tension state, then the tension is determined to be below a tension threshold level, and a proximity sensor actuates a signaling device that alerts a user.

U.S. Pat. No. 8,506,220 describes a sensing device that during normal operation is attached to a tensioned strap holding a load on a vehicle. A probe engages the strap and causes a signal lamp to light up if the tension in the strap is below a predetermined threshold value. The sensing device helps the vehicle operator to set the tension correctly before a journey and also provides a visible warning if a strap becomes loose during the journey. The warning is visible beyond the vehicle, to alert other road users to a possible hazard.

SUMMARY

An object of the embodiments is to substantially solve at least the problems and/or disadvantages discussed above, and to provide at least one or more of the advantages described below.

It is therefore a general aspect of the embodiments to provide a cargo strap tensioning and monitoring system that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. According to a first aspect of the embodiments, a cargo strap monitoring system is provided for virtual real time or real-time detection and reporting of cargo strap failure comprising a cargo strap winch comprising a spindle with a slot. The spindle provides a housing for circuitry operably linked to a pressure sensor in the form of a pressure sensor strip. According to a further aspect of the embodiments, the pressure sensor strip is operatively connected to the circuitry via the slot. The pressure sensor extends from the slot. During normal operation, a cargo strap is wrapped around and deployed from the spindle. The pressure sensor detects unsafe tension in the cargo strap. The circuitry includes a transceiver and a processor. Upon detection of an unsafe tension condition the transceiver transmits a warning to a monitor that can be remotely located. According to a further aspect of the embodiments, the monitor can be remotely located in a cab of a vehicle, such as land-based cargo carrier (e.g., flatbed truck), or in the bridge of a boat, or the cockpit of a cargo carrying aircraft, among other vehicles. According to further aspects of the embodiments, the remote monitor can be any device capable of receiving a wireless signal such as, but not limited to, a mobile terminal (i.e., a cell phone or mobile terminal). The spindle with a slot and circuitry including the pressure sensor can be sold as a kit suitable for retrofitting to cargo strap winches. According to further aspects of the embodiments, the remote monitor can include a light emitting diode (LED) or a liquid crystal display (LCD) monitor, or can utilize a "smart" phone, i.e., a long term evolution (LTE) fourth generation (4G) cellular communication device. According to additional aspects of the embodiments, the monitor can also be any type of monitor including, but not limited to an LED monitor, plasma display, or even a cathode ray tube (CRT) type display, including any modifications or improvements to any of the monitors discussed above, as well as others not mentioned.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Aspects of the embodiments described herein are better understood by reference to the following drawing in which:

FIGS. 8A, 8B, 8C, 8D, 8E, 8F, 8G, and 8H illustrates several mechanical views of the cargo strap tension warning system according to further aspects of the embodiments.

DETAILED DESCRIPTION

Figure 1A:
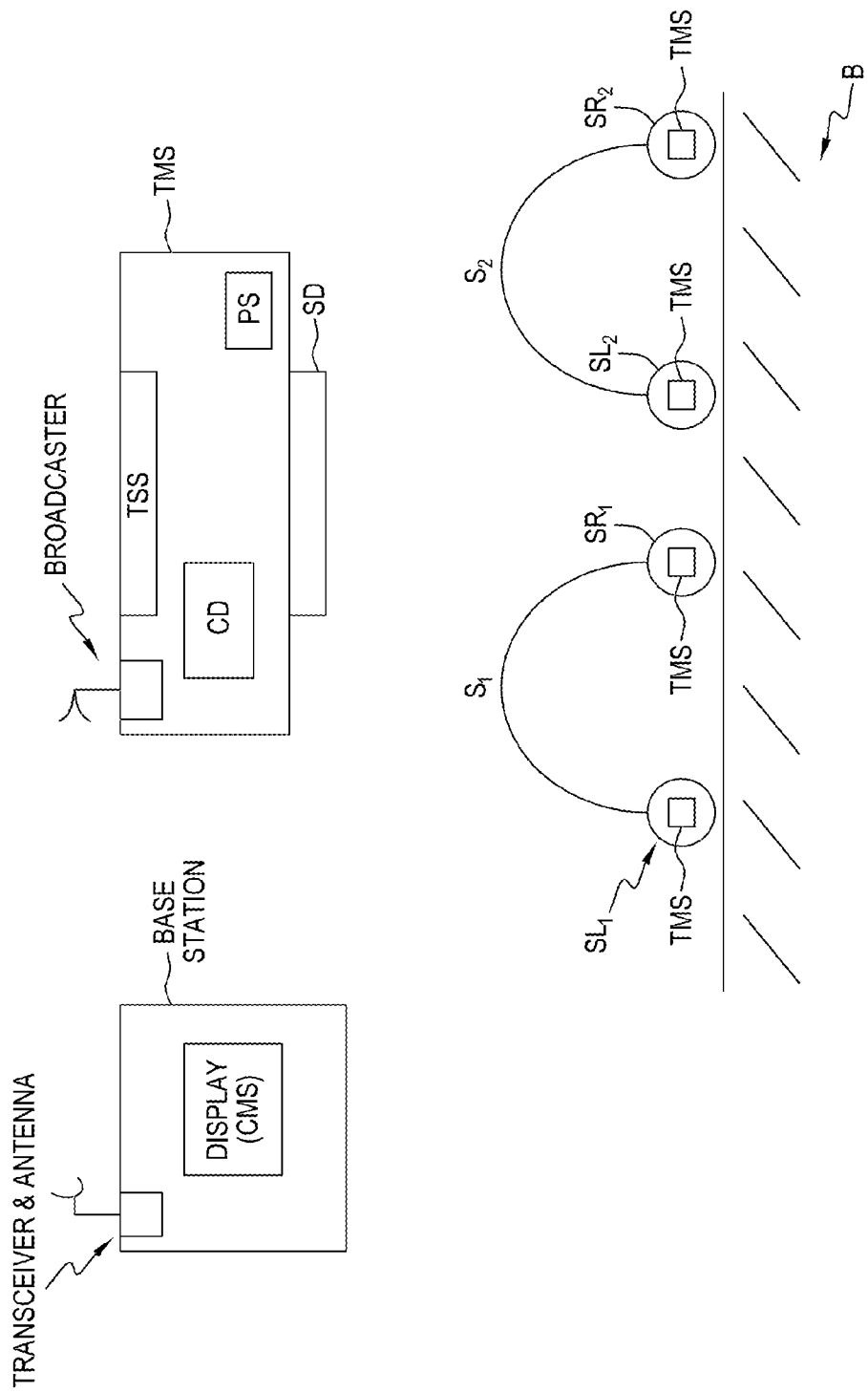
FIG. 1A illustrates a first block diagram view of a cargo strap monitoring system according to aspects of the embodiments.

The following embodiments are directed to a cargo strap monitoring system (CSMS) for near real time or real-time detection and reporting of cargo strap failure and other potential safety hazards. According to an embodiment, the cargo strap monitoring system includes tension-monitoring hardware in the form of a base, which includes a computer (a RISC), monitor and controller, and a tension-monitoring module, which typically comes in the form of a cylinder that is mounted into a winch and detects strap tension. According to further aspects of the embodiments, a cargo strap tension warning algorithm is provided that monitors the tension and reports the same for one or more straps, and according to still further aspects of the embodiments, tension monitoring hardware is provided in combination with a cargo strap tension warning algorithm.

According to further aspects of the embodiments, the cargo strap monitoring system provides a driver, who is transporting strapped-down cargo, with direct feedback of the current state of all straps in use. At a minimum, the cargo strap monitoring system allows the driver to be automatically notified that there may be something wrong with a strap. The cargo strap monitoring system according to aspects of the embodiments notifies the driver of potential problems with cargo straps by, among things, placing a sensor inside a standard winch. The winch may be substantially unmodified or altered. According to aspects of the embodiments, the winch sensor detects whether it is currently in storage, in the process of being tightened down, currently securing cargo, and/or potentially in a dangerous situation. Throughout its operation, the sensor of each winch will transmit this information to a device that sits within sight of the driver giving him/her a quick overview of the entire system. According to further aspects of the embodiments, if at any time the cargo strap monitoring system decides that it needs the attention of the driver, it can alert the driver with either or both audible and visual alarms. According to further aspects of the embodiments, use of the cargo strap monitoring system is not limited to the truck transportation industry, but can be used in moving cargo by trains, aircraft, boats, and other means, and can also be used to alert others about the status of doors, refrigeration, security, and other items.

It is to be understood that the terms "top", "bottom", "left", "right", "side", "front", "rear", "upper", "lower", "vertical", "horizontal", "height", "width", "length" and the like are used herein merely to describe points of reference and do not limit the different aspects of the embodiments to any specific orientation or configuration. According to further aspects of the embodiments, the apparatus and components may be of any size, shape or configuration suitable for operation of the apparatus and can be constructed of any suitable materials. In addition, as used in this specification and the appended claims, the singular forms "a", "an", and "the" do not denote a limitation of quantity, but rather denote the presence of at least one of the referenced items unless clearly indicated otherwise.

Figure 1B:
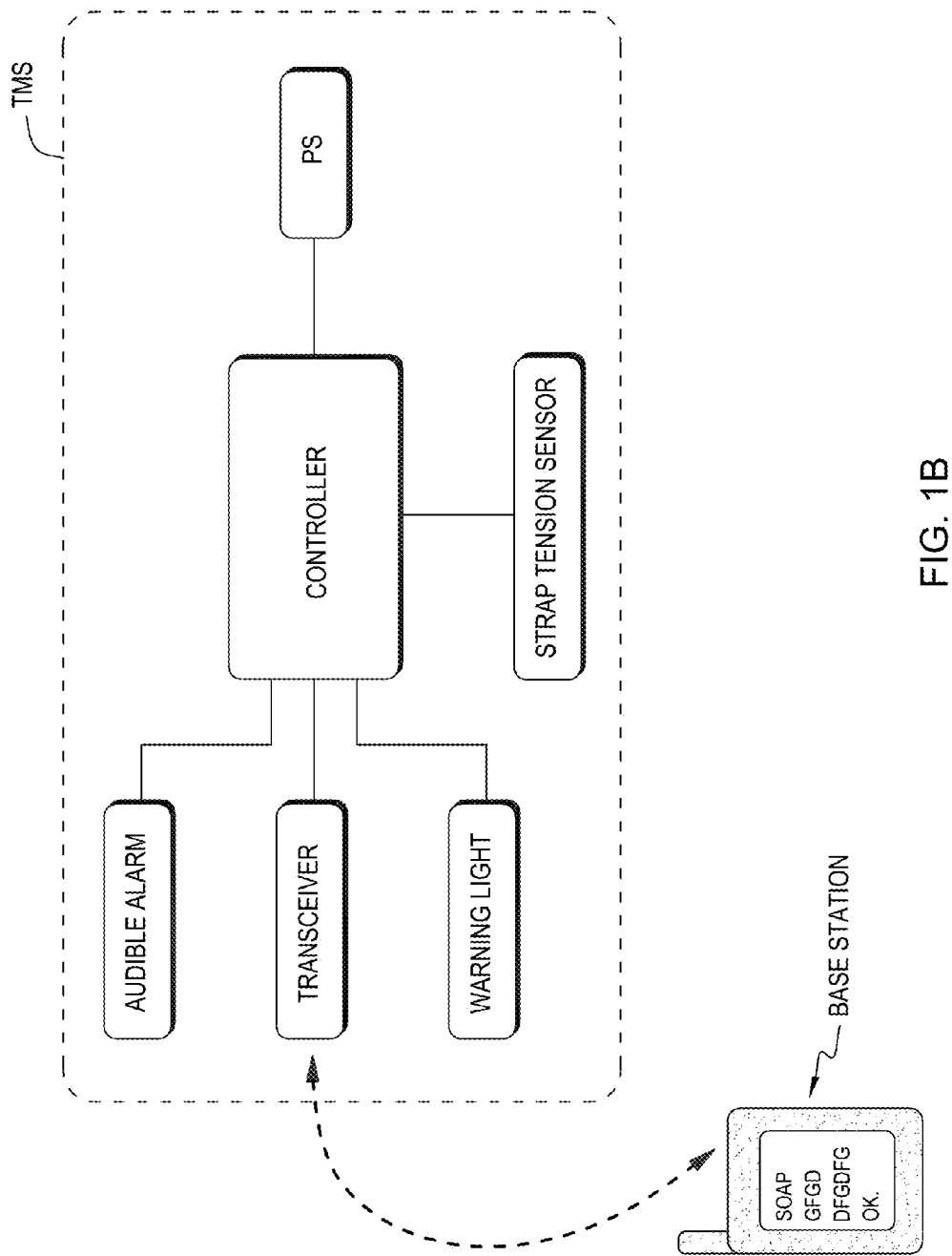
FIG. 1B illustrates a second block diagram view of the cargo strap monitoring system according to aspects of the embodiments.
Figure 2A:
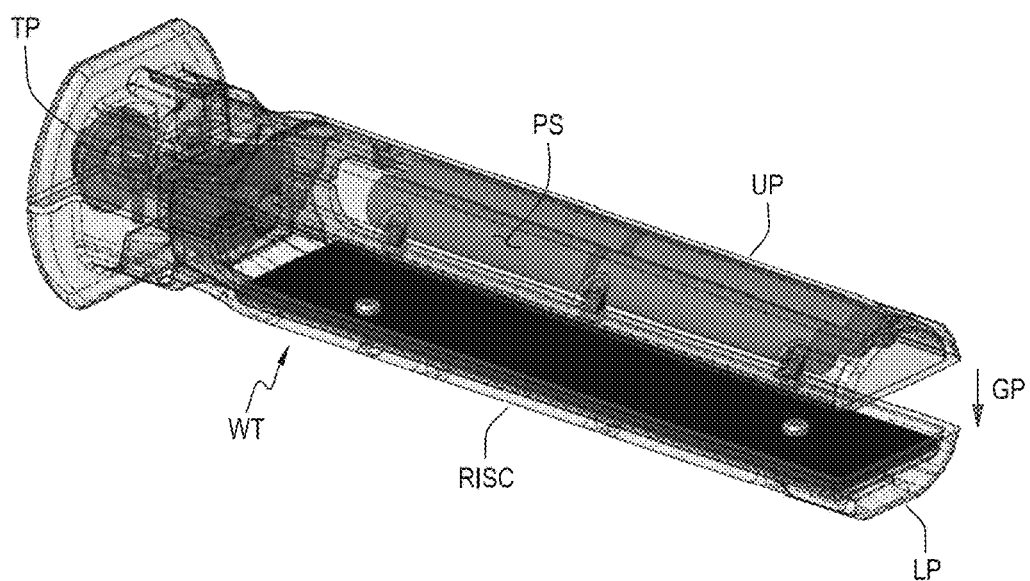
FIG. 2A illustrates a top side cutaway view of a tension monitoring pin of the tension monitoring system according to aspects of the embodiments.
Figure 2B:
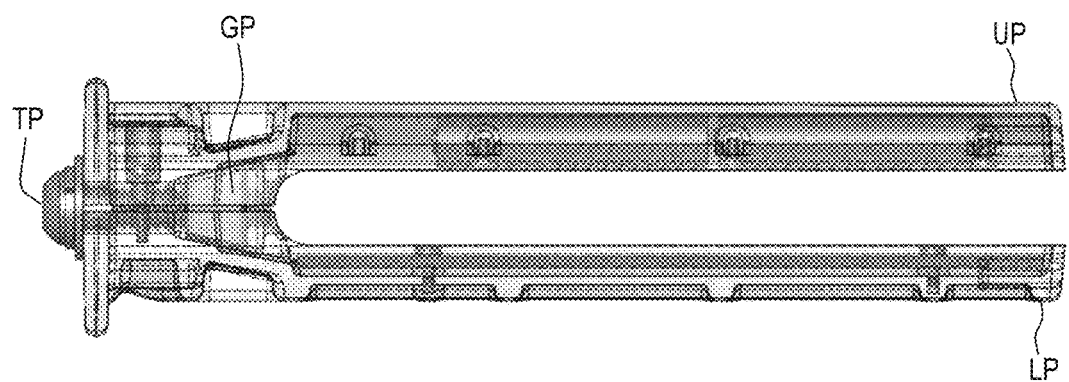
FIG. 2B illustrates a side view of the tension monitoring pin of the tension monitoring system of FIG. 2A.
Figure 2C:
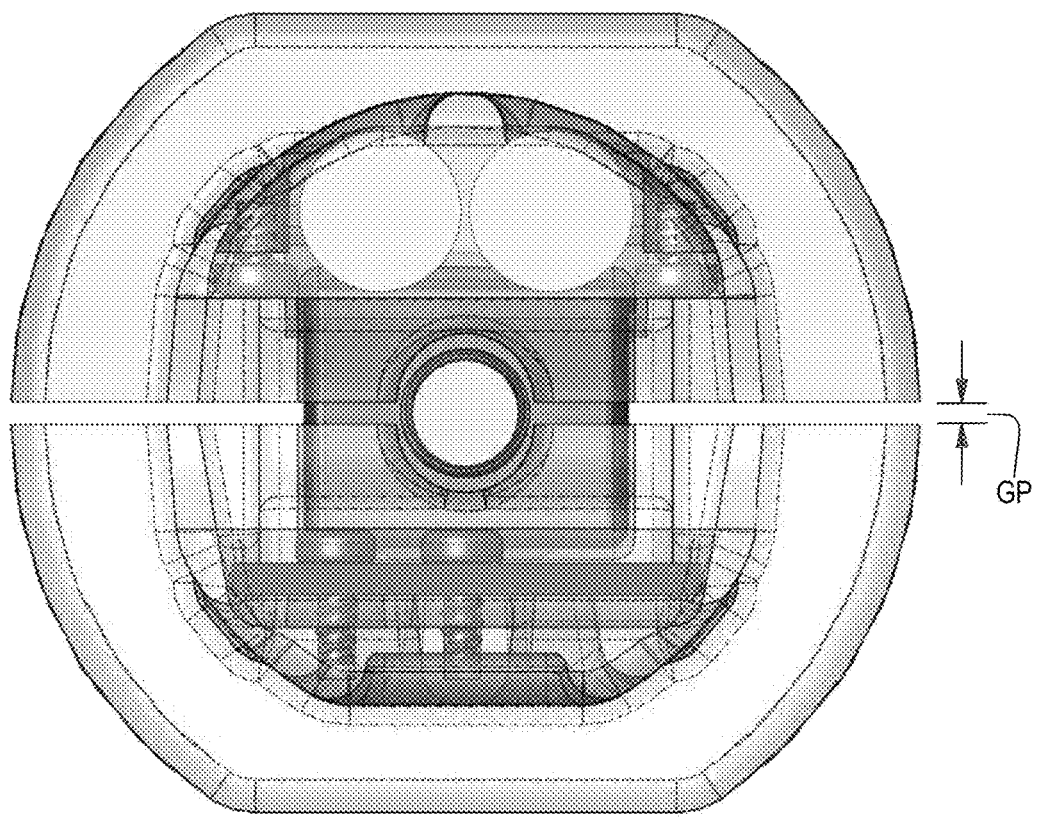
FIG. 2C illustrates a front view of the tension monitoring pin of the tension monitoring system of FIG. 2A.
Figure 2D:
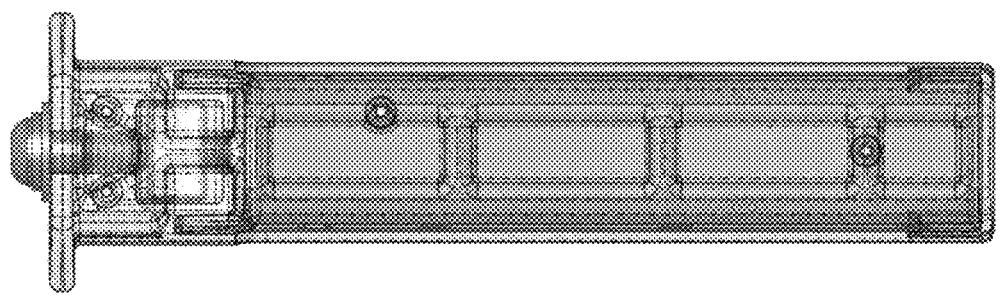
FIG. 2D illustrates a bottom view of the tension monitoring pin of the tension monitoring system of FIG. 2A.
Figure 2E:
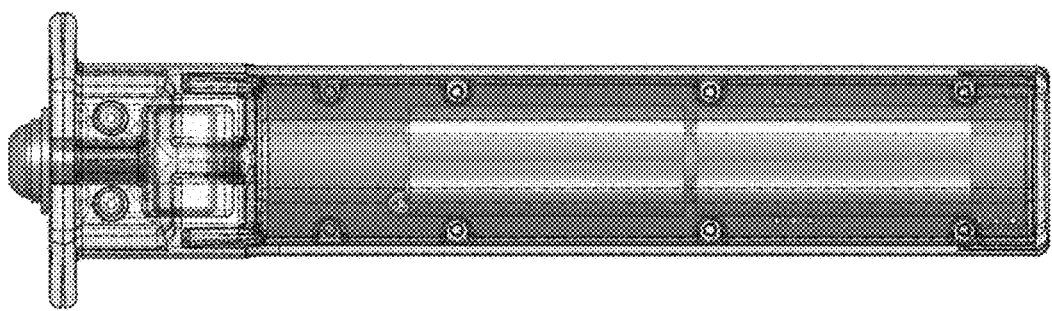
FIG. 2E illustrates a top view of the tension monitoring pin of the tension monitoring system of FIG. 2A.
Figure 3A:
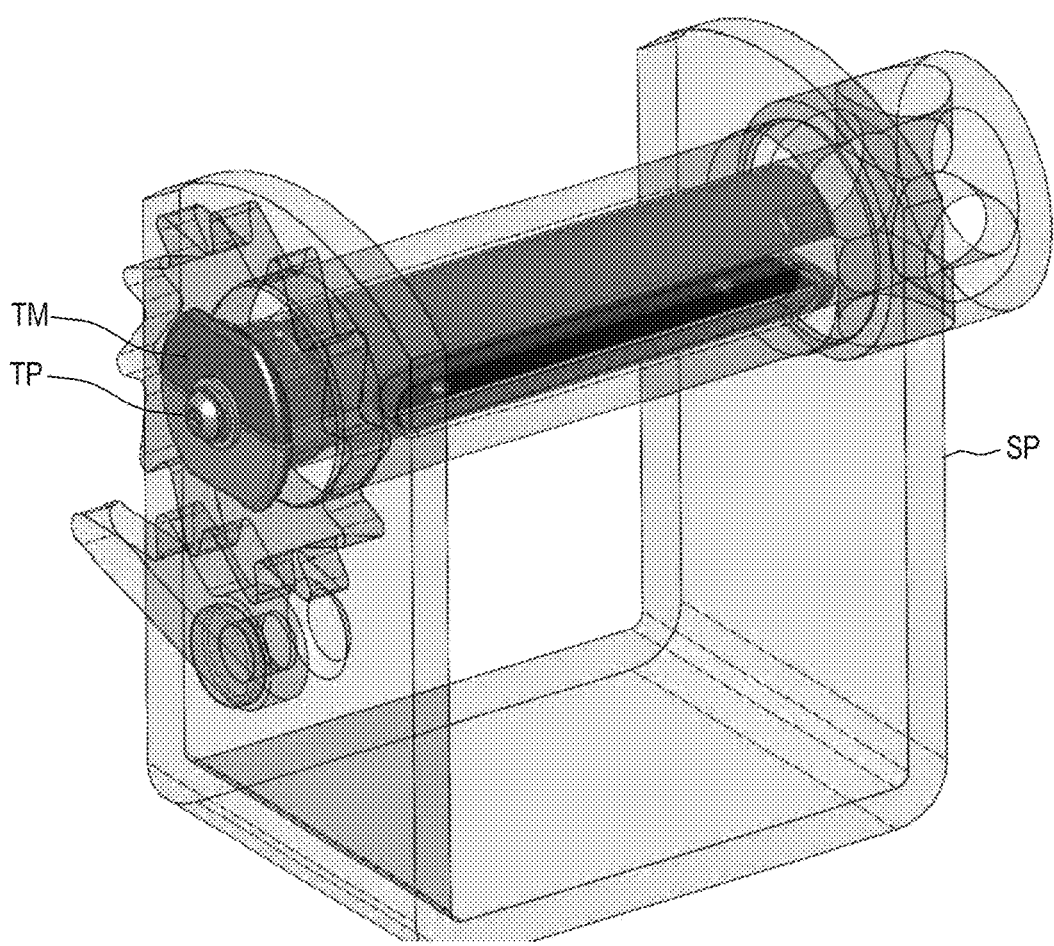
FIG. 3A illustrates a perspective side view of a tension monitoring cylinder used in the tension monitoring system according to aspects of the embodiments.
Figure 3B:
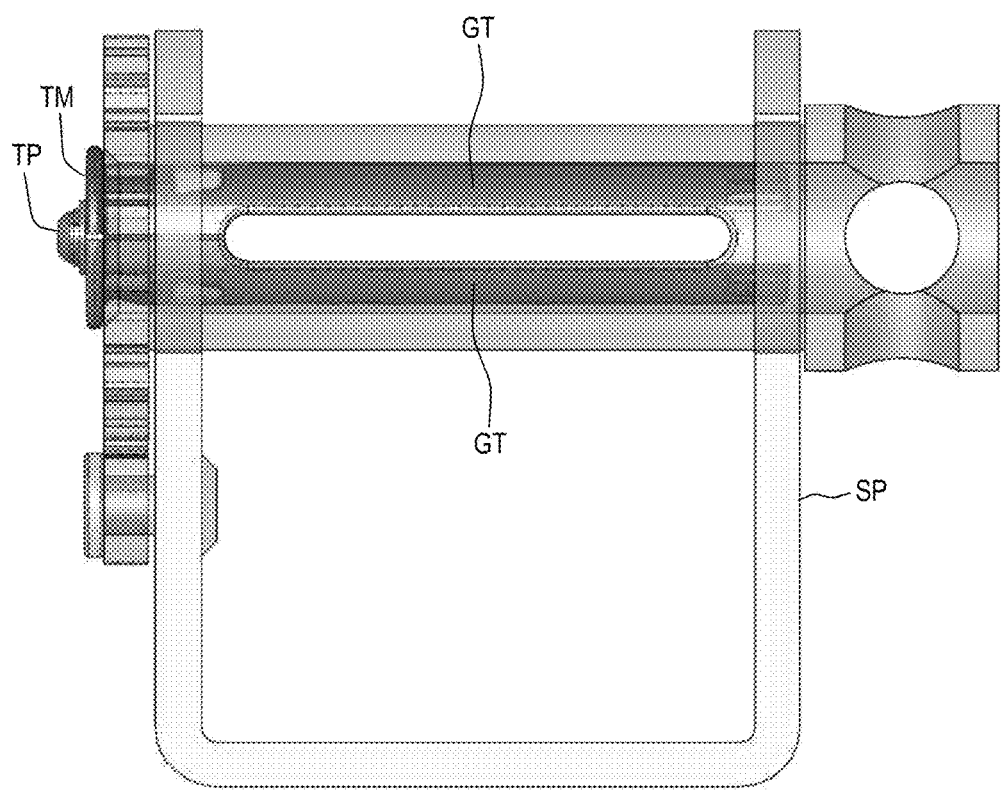
FIG. 3B illustrates a side view of the tension monitoring pin of the tension monitoring system according to aspects of the embodiments.
Figure 3C:
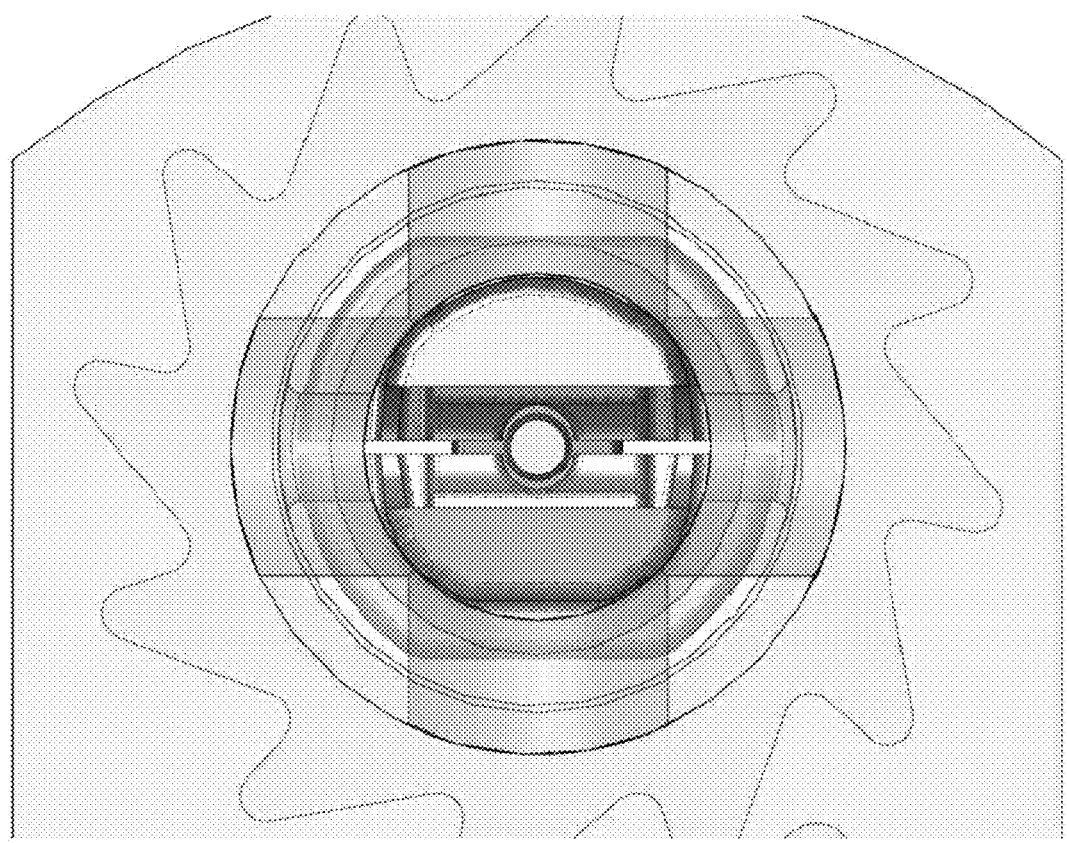
FIG. 3C is a close-up rear end view of the tension monitoring pin in place in the tension monitoring system according to aspects of the embodiments.
Figure 3D:
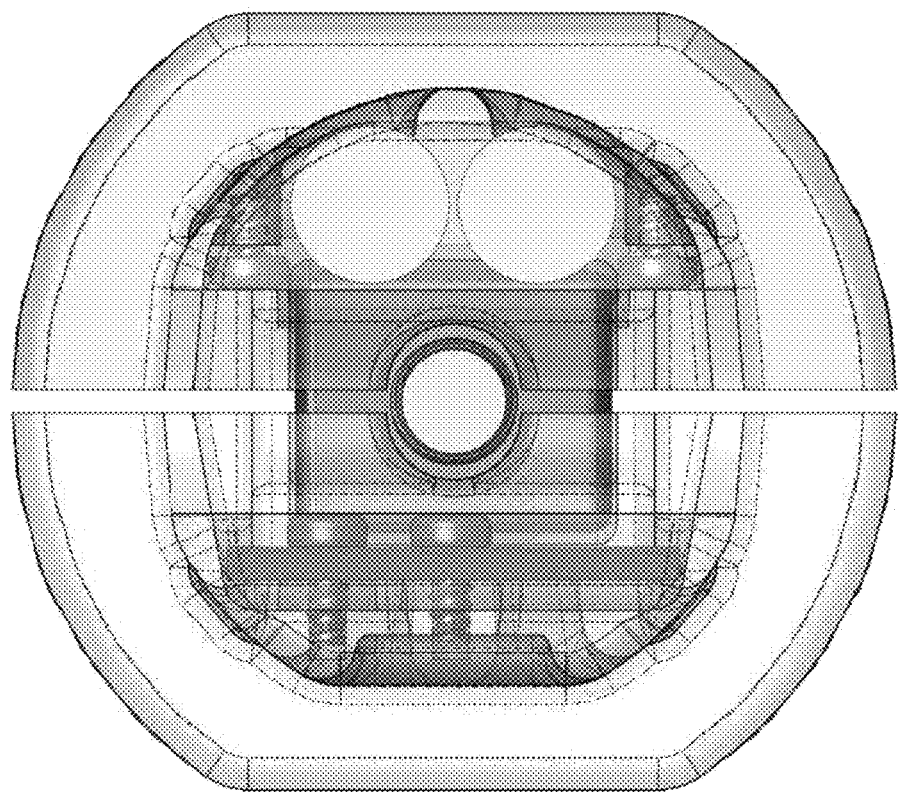
FIG. 3D is a front end view of the tension monitoring pin of the tension monitoring system according to aspects of the embodiments.

Now referring to FIG. 1A, a high-level depiction of a tension monitoring system according to aspects of the embodiments is shown and illustrated. The main components of the tension monitoring system (TMS) according to an aspect of the embodiments include a base B, which further includes a control monitor screen (CMS), a tension monitoring cylinder (TM), and which fits into the base of provided winches SL1/SR1 and SL2/SR2 that support cargo straps S1 and S2, respectively. The TMS further includes a power source PS, tension sensing strip TSS, a specialized computational device CD, and a broadcaster B as well as a securing device SD. According to aspects of the embodiments, the tension monitoring system can use from 1 to 16 cargo straps (usually in an even number) in a truck (or other transport vehicle). FIG. 1B illustrates the functional diagram of FIG. 1A at a block level.

FIGS. 2A, 2B, 2C, 2D, and 2E illustrate, according to an aspect of the embodiments, the tension monitoring cylinder or "clothespin" TM. The tension monitoring cylinder TM fits into the existing cylindrical "slot" provided by a standard winch spool (see FIGS. 3A-E for in situ placement). The tension monitoring cylinder TM may be of different "sizes" without departing from the spirit and scope of the aspects of the embodiments. The tension monitoring "clothespin" TM includes upper and lower portions UP/LP, each of which contain electronic components necessary for the operation of the device. The upper portion UP includes a power source in the form batteries PS. This powers the reduced instruction set computer RISC in the lower portion which also includes a wireless transmission device WT, that may be Federal Communications Commission (FCC) compliant, and capable of transmitting to the base B in the cab of the truck. The tension sensing strap (see FIGS. 4A-K) TSS is operatively connected to the RISC to provide the tension data needed to calculate whether the strap is being maintained within an acceptable safety margin.

As shown by FIGS. 2A-E, the "clothespin" shape of the tension monitoring cylinder, in general, provides a shape in which the power source, in the form of a battery, is located in one "prong" of the clothespin. The reduced instruction computer is powered by the batteries and takes information from the tension detection strap (not shown), processes it, and wirelessly transmits any necessary data to the base station B. By using a custom computer with few instructions, power is preserved.

As shown in FIGS. 2A-E, the tightening mechanism TP, usually in the form of a hex screw, moves the upper portion UP and lower portion further and closer to each other, closing or widening the gap between the two parts, shown as GP. When the gap is small, the cylinder can be easily removed, but when the gap is widened, the portions of the cylinder create tension inside of the spool cylinder. According to aspects of the embodiments, the gap GP is adjusted using a hex wrench, and illustrated in FIGS. 4A-E.

FIGS. 3A-D provide a view of the tension monitoring cylinder in situ in the base of a sample winch. Although FIGS. 3A-D show substantially the same embodiment of the tension monitoring cylinder as shown in FIGS. 2A-E, a further aspect of the embodiments is the ability of the tension monitoring system to readily adapt into a variety of standard winches simply by adjusting the tightening mechanism TP. Shown below in FIGS. 4A-K is the application of a special tape that allows the tension sensor strip to be easily secured.

Figure 4A:
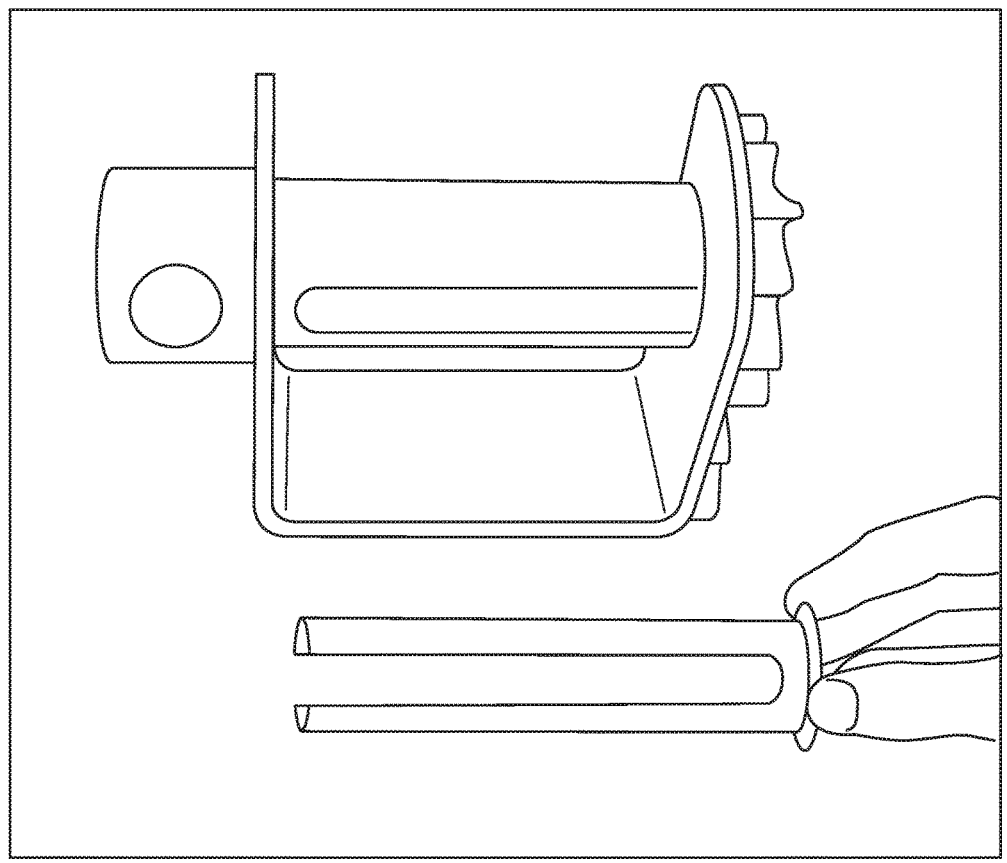
FIG. 4A is a perspective view diagram of a first step in installing the tension monitoring pin of the tension monitoring system according to aspects of the embodiments.
Figure 4B:
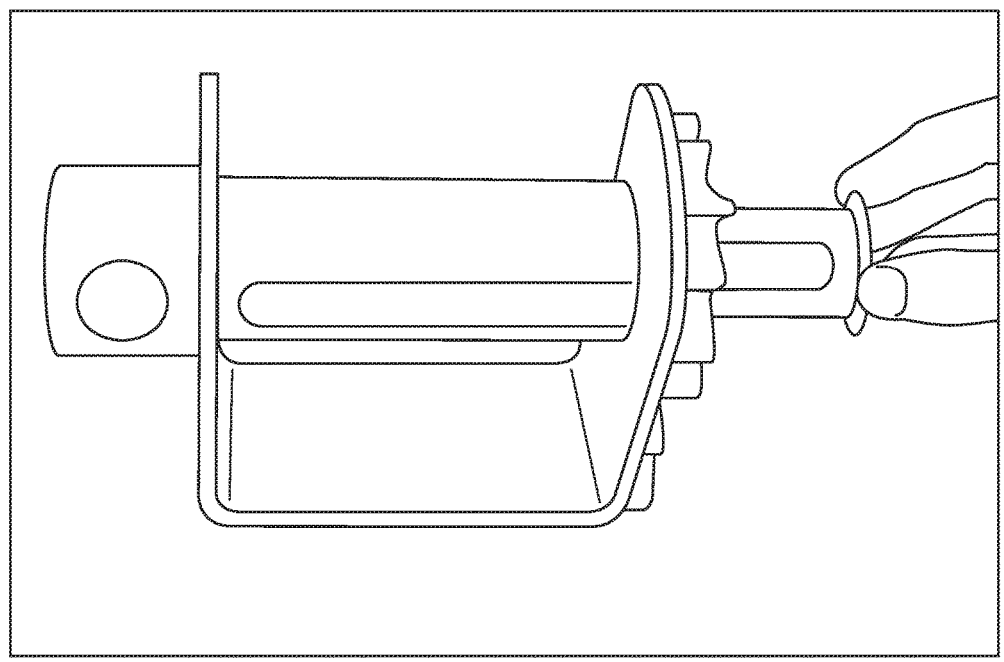
FIG. 4B is a perspective view diagram of an insertion step in installing the tension monitoring pin of the tension monitoring system according to aspects of the embodiments.
Figure 4C:
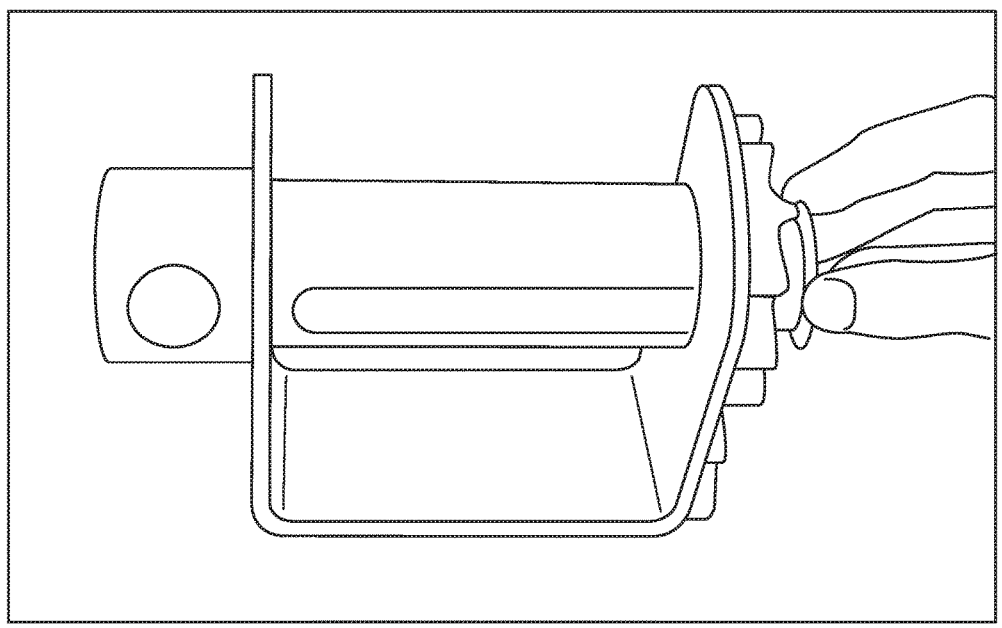
FIG. 4C illustrates a perspective view of the end of the insertion step in installing the tension monitoring pin of the tension monitoring system according to aspects of the embodiments.
Figure 4D:
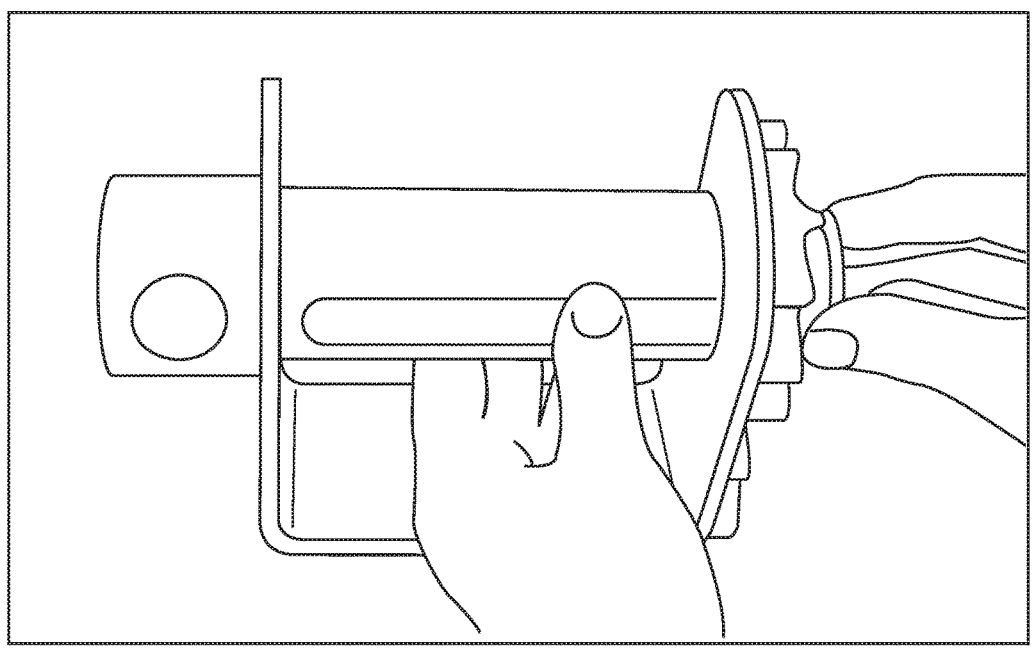
FIG. 4D illustrates the tension monitoring system following complete insertion of the tension monitoring pin into the tension monitoring system according to aspects of the embodiments.
Figure 4E:
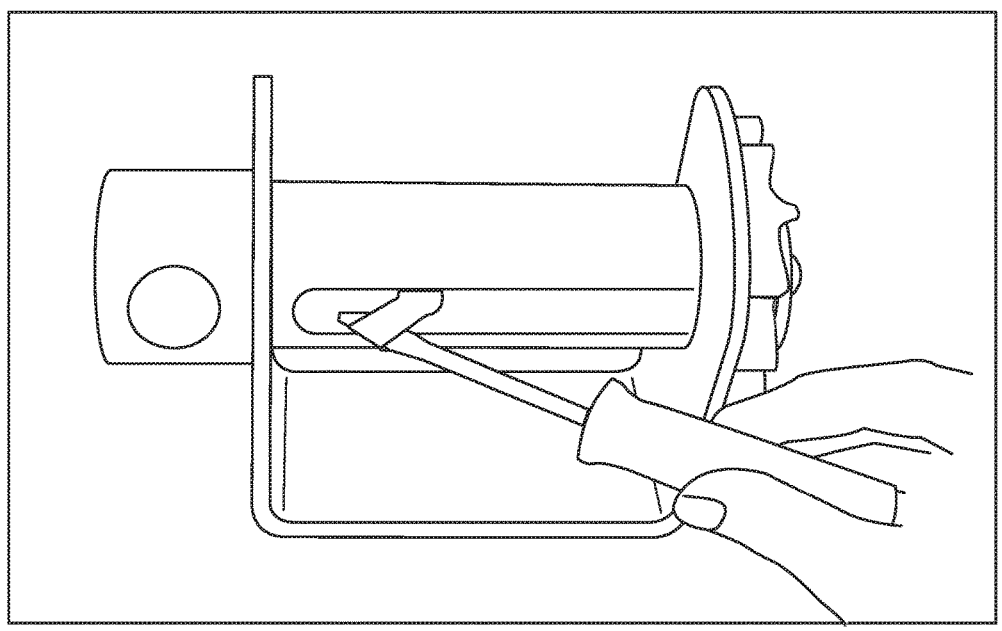
FIG. 4E illustrates a perspective view showing the process of locating a tension sensor strip in the tension monitoring system according to aspects of the embodiments.
Figure 4F:
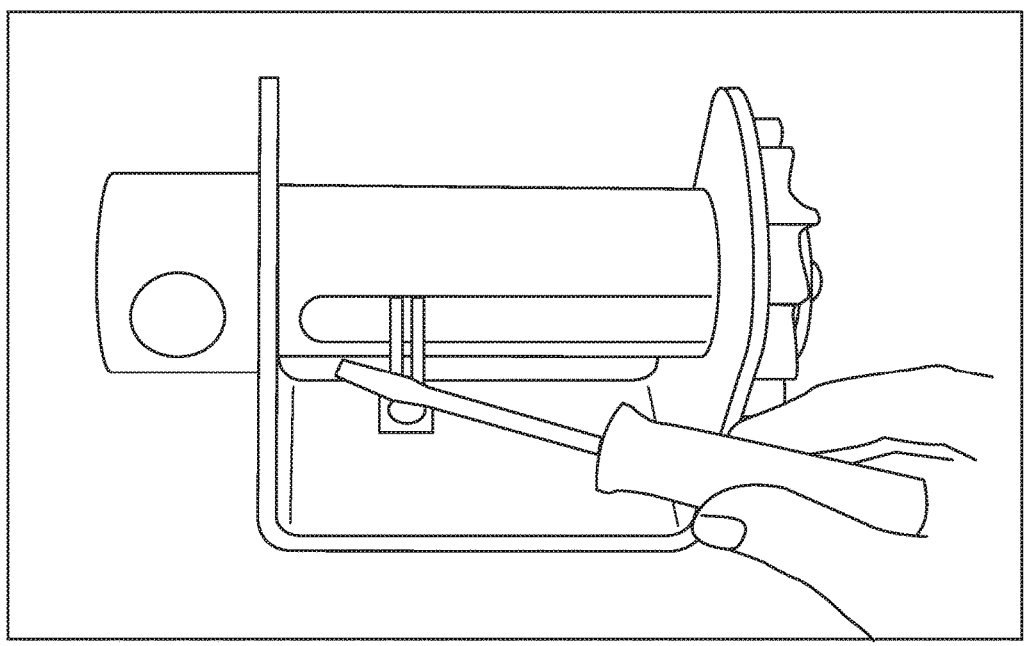
FIG. 4F illustrates a perspective view showing placement of the tension sensor strip in the tension monitoring system according to aspects of the embodiments.
Figure 4G:
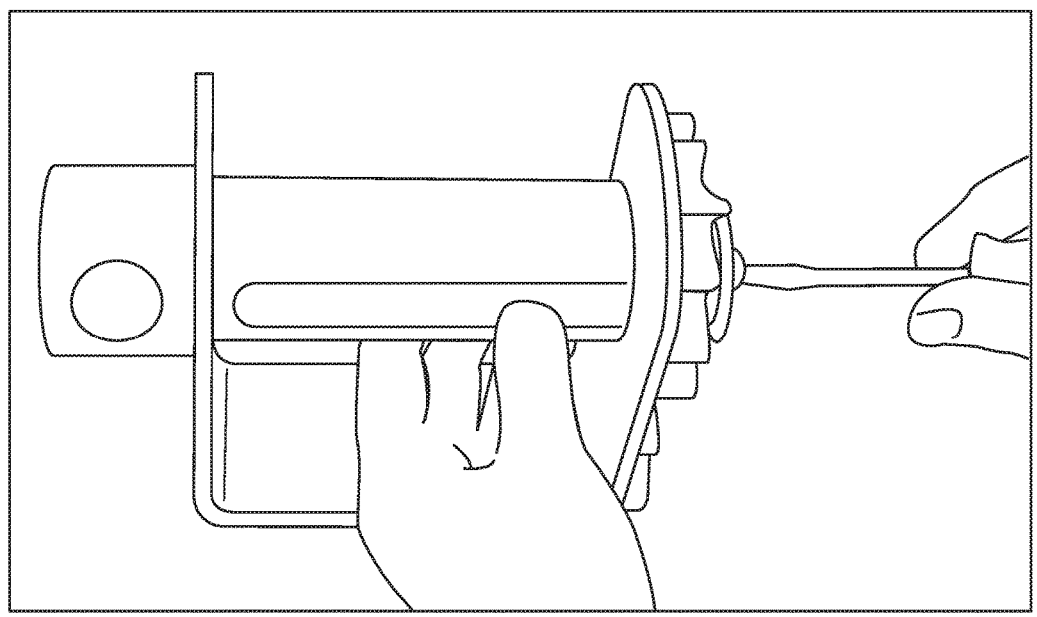
FIG. 4G illustrates a perspective view showing a tightening of the tension monitoring system into place according to aspects of the embodiments.
Figure 4H:
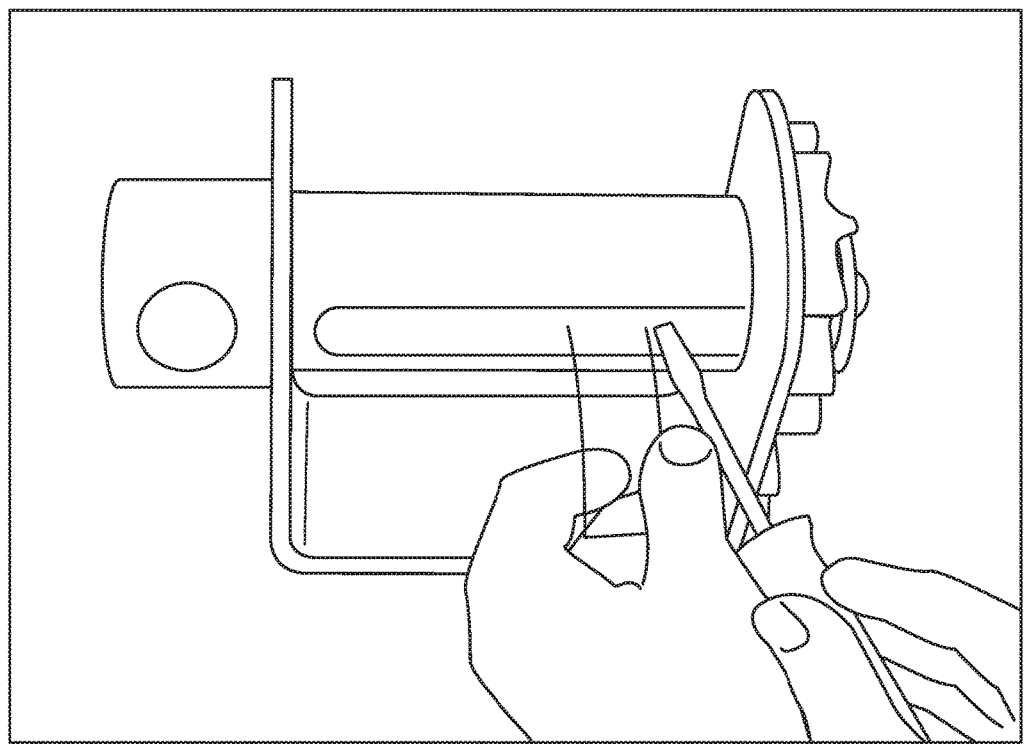
FIGS. 4H, 4I, 4J, and 4K illustrate perspective views of placing a tension strip holding tape into the tension monitoring system according to aspects of the embodiments.
Figure 4I:
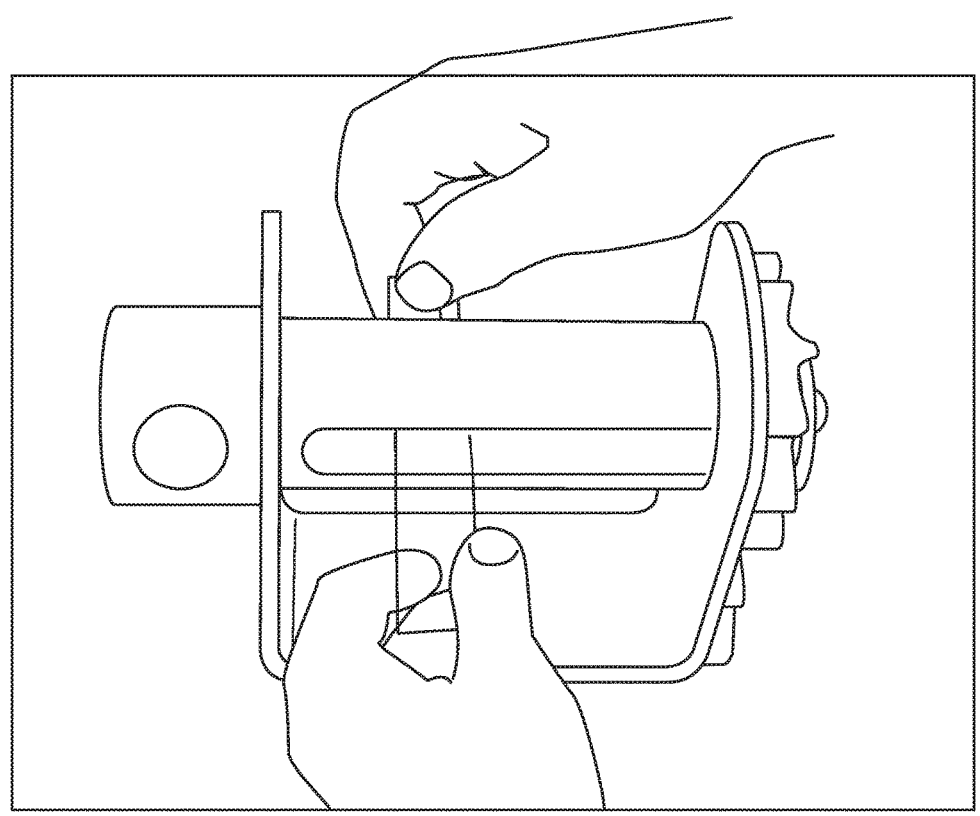
Figure 4J:
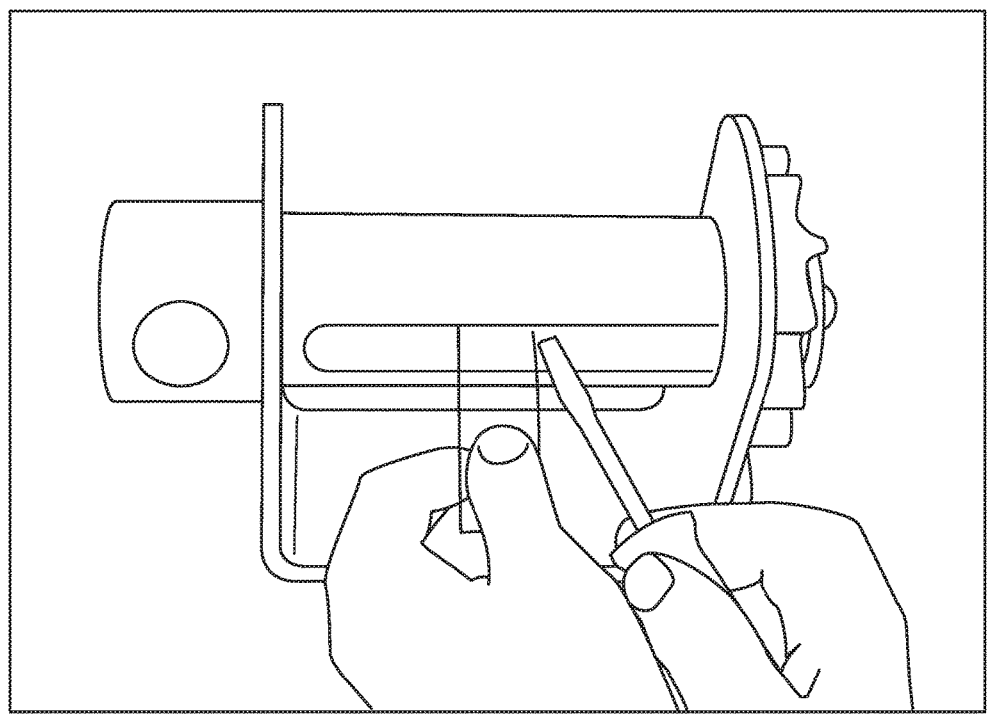
Figure 4K:
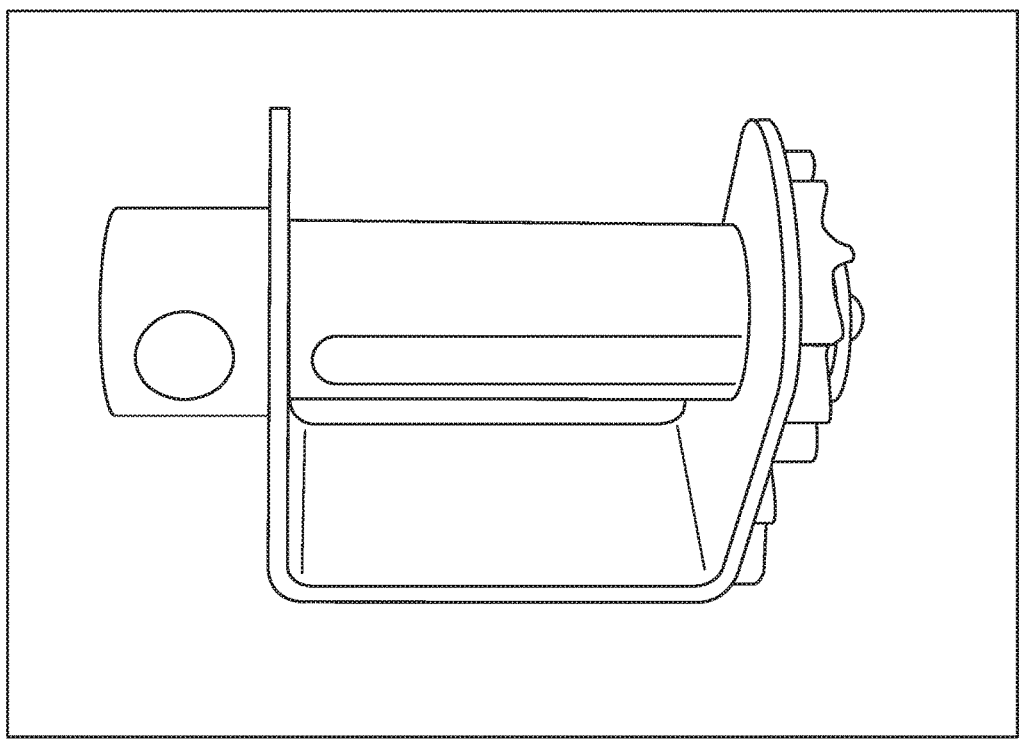

FIGS. 4A-K provide a view of the installation of the clothespin tension monitoring device into a winch. FIG. 4A illustrates the first step of installing a tension monitoring pin; FIG. 4B illustrates the insertion step of installing a tension monitoring pin; FIG. 4C illustrates the end of the insertion step for installing a tension monitoring pin; FIG. 4D illustrates complete insertion of the tension monitoring cylinder; FIG. 4E illustrates the locating of the tension sensor strip; FIG. 4F illustrates the placing of the tension sensor strip; FIG. 4G illustrates the tightening of the tension monitoring system into place; FIGS. 4H-K illustrates placing the tension strip holding tape. As those of skill in the can appreciate, all of the steps shown in FIGS. 4A-K do not necessarily need to be performed, nor do they need to be performed in any particular order according to further aspects of the embodiments. Further, those of skill in the art should now be able to appreciate the ease of which a tension detection cylinder can be installed into each winch according to aspects of the embodiments.

Figure 5A:
FIG. 5A illustrates a sample base station displaying a road map view for use with the tension monitoring system according to aspects of the embodiments.
Figure 5B:
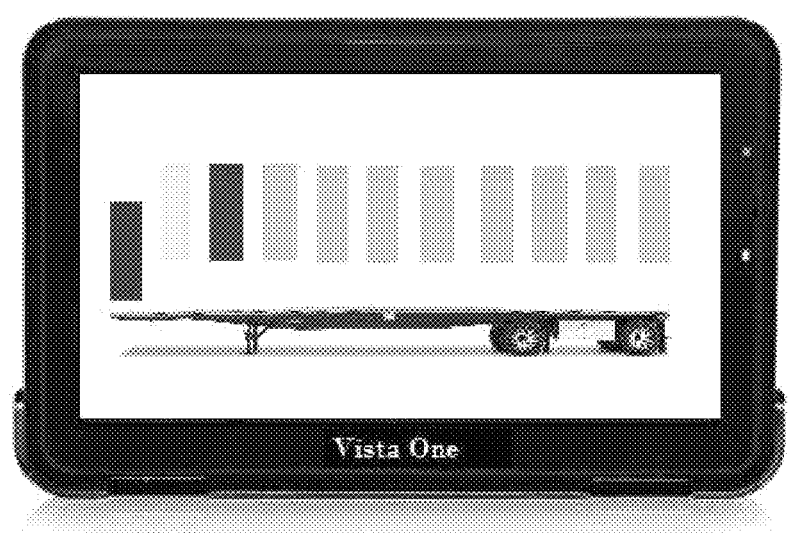
FIG. 5B illustrates the sample base station of FIG. 5A, showing a condition of one of a plurality of straps being monitored by the cargo strap monitoring system according to aspects of the embodiments.

FIG. 5 illustrates a sample base according to an aspect of the embodiments, in which various factors relating to the cargo straps can be monitored and tallied. In general, the base will be compact and measure around 8-10×4-5 inches for easy display and storage. The base, as described above, can include a computer, for example a RISC for low power consumption, a power source (whether by battery or using the power system of the vehicle), a wireless receiver and a display (and in alternate embodiments can also include a wireless transmitter). According to further aspects of the embodiments, a touchscreen can be used as the display. According to further aspects of the embodiments, there are a variety of manners in which the cargo strap information can be displayed, all of which can be considered to be within the scope of the embodiments. However, in fulfillment of the dual purposes of clarity and brevity, only a few manners of information display are shown and described herein. FIGS.

Figure 6A:
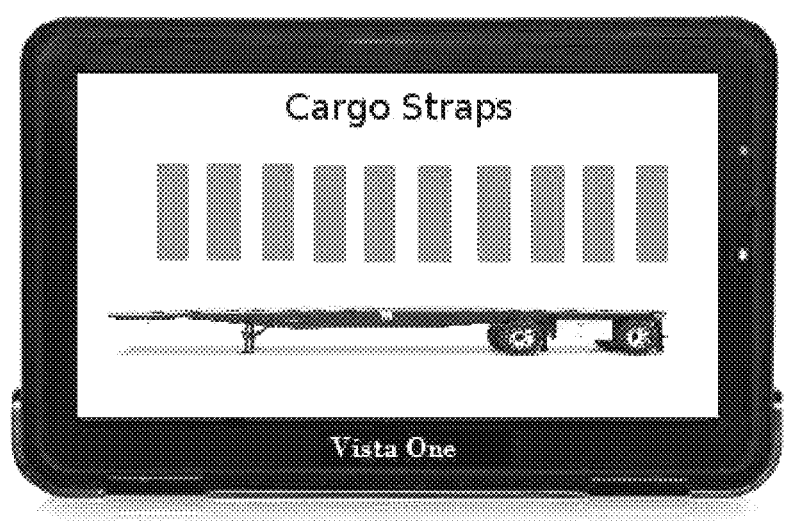
FIG. 6A illustrates a portion of a base station monitor displaying a first "Ok" view according to aspects of the embodiments.
Figure 6B:
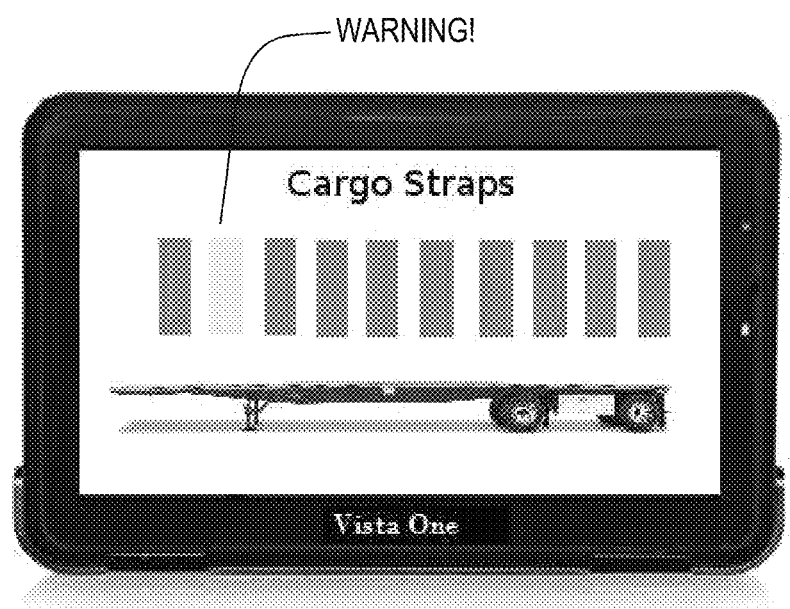
FIG. 6B illustrates a portion of the base station monitor displaying a warning view according to aspects of the embodiments.
Figure 6C:
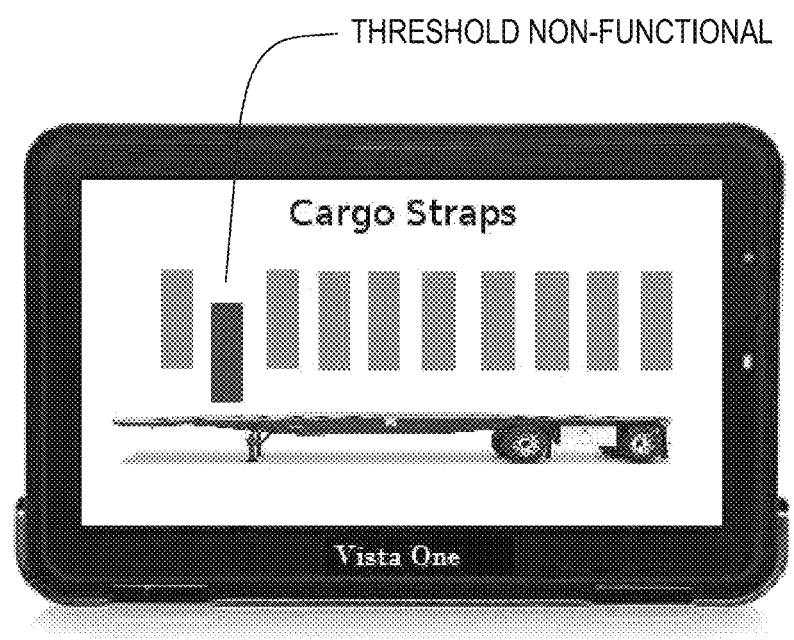
FIG. 6C illustrates a portion of the base station monitor displaying a warning view with dropped icon according to aspects of the embodiments.

6A-C are illustrative of a simply display system using a bar for each strap and colors to indicate the status of each strap. According to aspects of the embodiments, it is recognized that some users would prefer less information to be displayed, while other users would prefer more information. In operation, there are times when a user has just changed a cargo strap, so, as shown in FIG. 6A, an "ok" color or bar can be indicated when the base station is queried. According to further aspects of the embodiment, the simplicity of the status of each strap means less maintenance for the end user. Safety parameters can be programmed to local transportation safety standards and guidelines (or laws).

Figure 7:
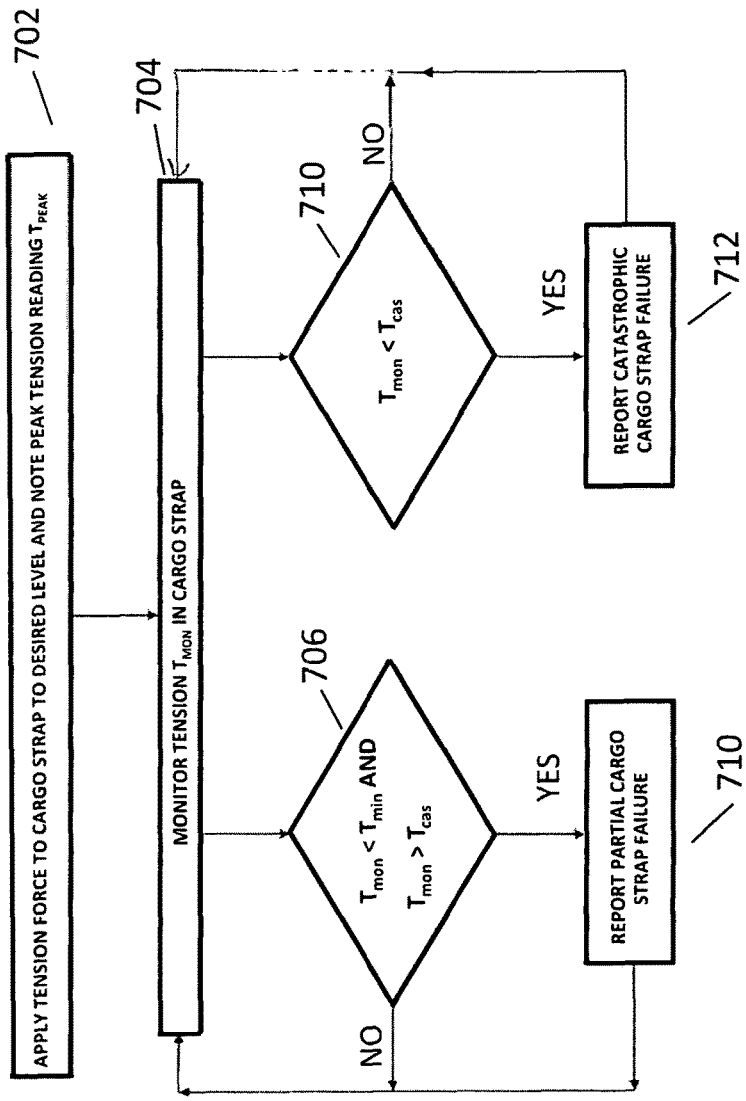
FIG. 7 illustrates a flow diagram of a method for generating a cargo strap tension warning according to aspects of the embodiments.

FIG. 7 illustrates a flow diagram of method 700 for generating a cargo strap tension warning according to aspects of the embodiments (hereinafter referred to as "TMW algorithm 700") according to an embodiment. It should be understood that while only one cargo strap is discussed here, it is the case that a plurality of cargo straps can be monitored in accordance with TMW algorithm 700. At step 702 tension is applied to a cargo strap and once the cargo strap is fully tensioned the tension of the cargo strap is noted ($T_{peak}$) The tension of the strap is monitored at step 704 ($T_{mon}$). At decision step 706, if the tension $T_{mon}$ falls below a predetermined minimum value ($T_{min}$) but is greater than a predetermined catastrophic value ($T_{cas}$), then a partial cargo strap failure is reported at step 708 ("Yes" path from decision step 706) and then method 700 returns to step 704 wherein the tension in the strap is continuously monitored. However, if $T_{mon}$ does not satisfy either or both of the conditions shown in decision step 706 (i.e., if tension $T_{mon}$ does not fall below a predetermined minimum value ($T_{min}$), and/or is less than predetermined catastrophic value ($T_{cas}$), then method 700 returns to tension monitoring step 704 ("No" path from decision step 706). According to further aspects of the embodiments, decision steps 706 and 710 can be performed substantially simultaneously, i.e., in parallel. However, if the tension $T_{mon}$ falls below predetermined catastrophic value ($T_{cas}$) at decision step 710, then a catastrophic strap failure report is generated at step 712. If tension $T_{mon}$ stays above predetermined catastrophic value ($T_{cas}$), then decision step 710 returns to monitoring step 704 ("No" path from decision step 710). As those of ordinary skill in the art can appreciate, $T_{cas}$ represents, in essence, a catastrophic failure of the strap such that it is holding very little tension. $T_{min}$ represents a loosening of the strap such that a catastrophic event is imminent or likely, or at least needs to be addressed relatively quickly.

According to further aspects of the embodiments, the CSMS circuitry can be located in any suitable part of the tension monitoring hardware. Likewise, the pressure sensor can be located in any suitable place, but according to further embodiments (not illustrated), the pressure sensor can be located adjacent to the exterior surface of the spindle. According to further aspects of the embodiments, the CSMS circuitry is at least partly housed in the spindle of a cargo strap tightener, also known as a winch. A transceiver can be used to wirelessly transmit reports, and the transceiver can also receive wireless transmissions. According to further aspects of the embodiments, therefore, the transceiver can be replaced with a transmitter that transmits but does not receive wireless signals. Likewise, an audible alarm and warning indicator (e.g., light or lamp) can be used with a different warning reporting component, or either can be used alone.

As discussed above in regard to FIGS. 5A, 5B, and 6A-C, the operation of the warning system is generally according to end-user demands. For example, wireless-free embodiments can encompass such reporting systems as at least one warning light and/or audible alarm. By way of further non-limiting example, a reporting system can comprise three LEDs (light emitting diodes) per winch, wherein a white LED can indicate on-status, an orange LED can indicate a partial strap failure condition, and a red LED can indicate a catastrophic strap failure condition. Thus, a white LED alone would indicate system operation (i.e., switched on); a white plus an orange LED system on, and partial strap failure detected; and a white LED with a red LED would indicate system on and a catastrophic strap failure. The LEDs can further function by flashing. While the use of LEDs has been described herein, any suitable light indicator arrangement can also be used. For example, if an LCD/LED monitor were used, the warnings could be in the form of an audible alert, a visual indication (the words "WARNING", or something of similar effect, or a blinking indicator), or both.

According to various aspects of the embodiments, the strap tension monitoring system can be operated under assumed conditions for optimal performance. As such, these assumed conditions result in the minimization of false signals, particularly false negatives. The result of a false positive, while it affects performance, does not directly affect safety immediately, unless the end user decides that false positives are indicative of poor performance. For example, there are various ways that winches can be wound. However, one way to thread the strap into the winch is called the "Accordion" method. It is general knowledge that this method is taught by all the commercial trucking schools that discuss straps/winches, and is known by substantially all of the veteran drivers with significant amounts of experience. Most well experienced drivers prefer this method too. When the accordion method is used, false positives may be almost completely eliminated. Furthermore, when other methods are used, the system may display "green" even though the strap had been loosened. When the accordion method is used, the system according to aspects of the embodiment would correctly indicate yellow/red as the strap was loosened off the winch. Other parameters, such as temperature, moisture and road conditions, can also be considered in the internal algorithms and instructions provided. For example, it is industry practice to cover winches when not in use, so as to not expose them to unnecessary moisture, sand, salt, among other contaminants.

According to further aspects of the embodiments, the base station discussed above in FIGS. 1-6C, was shown and described to be an independent unit. According to further aspects of the embodiments, trucks or other vehicles can have a touch screen interface system that allows the base unit to be integrated into the already existing information system.

Figure 8B:
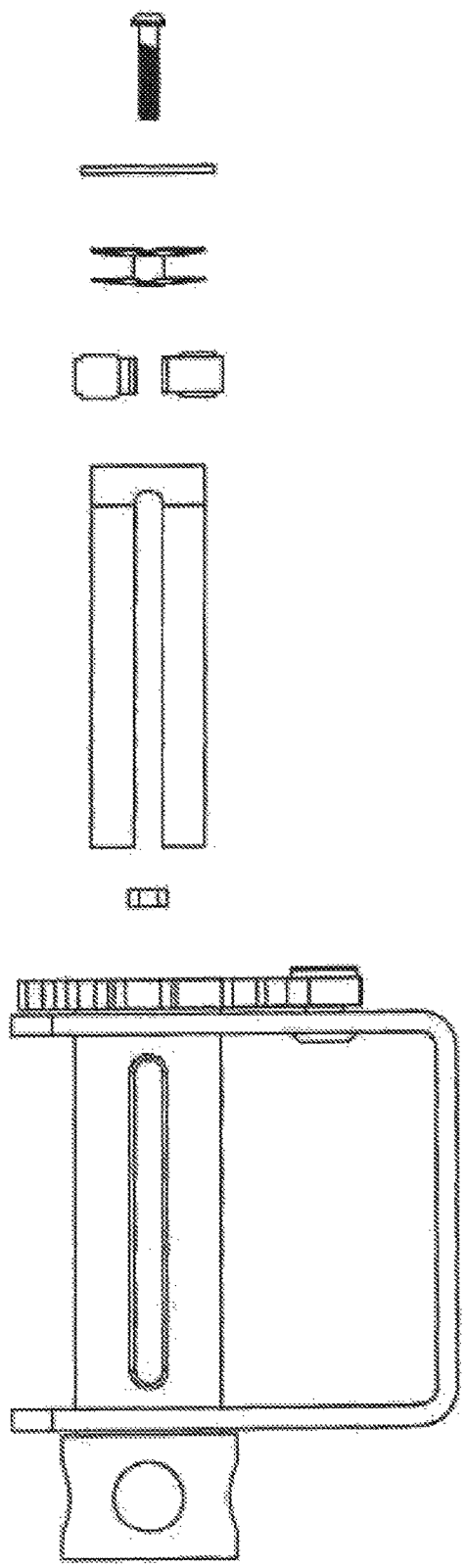
Figure 8C:
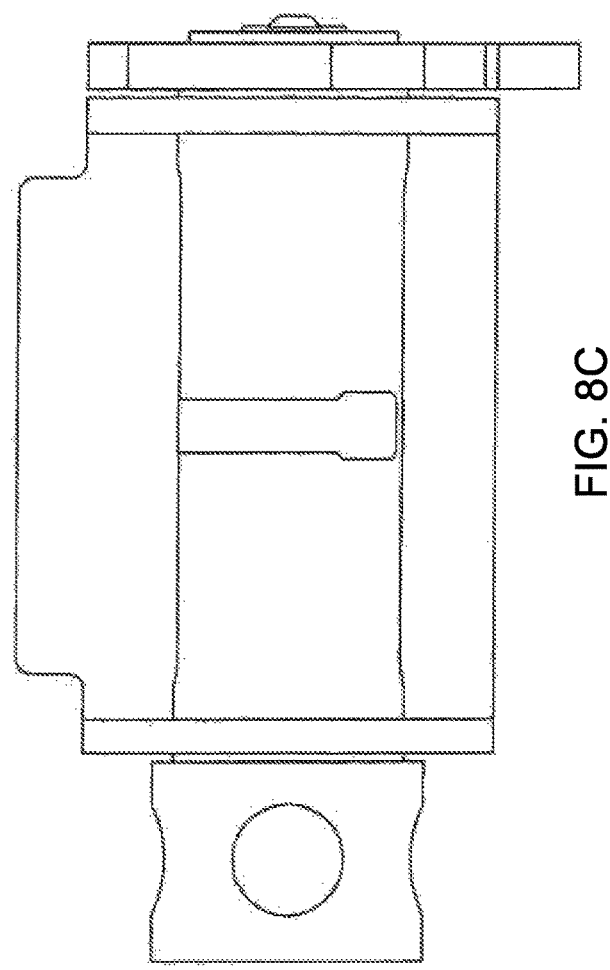
Figure 8D:
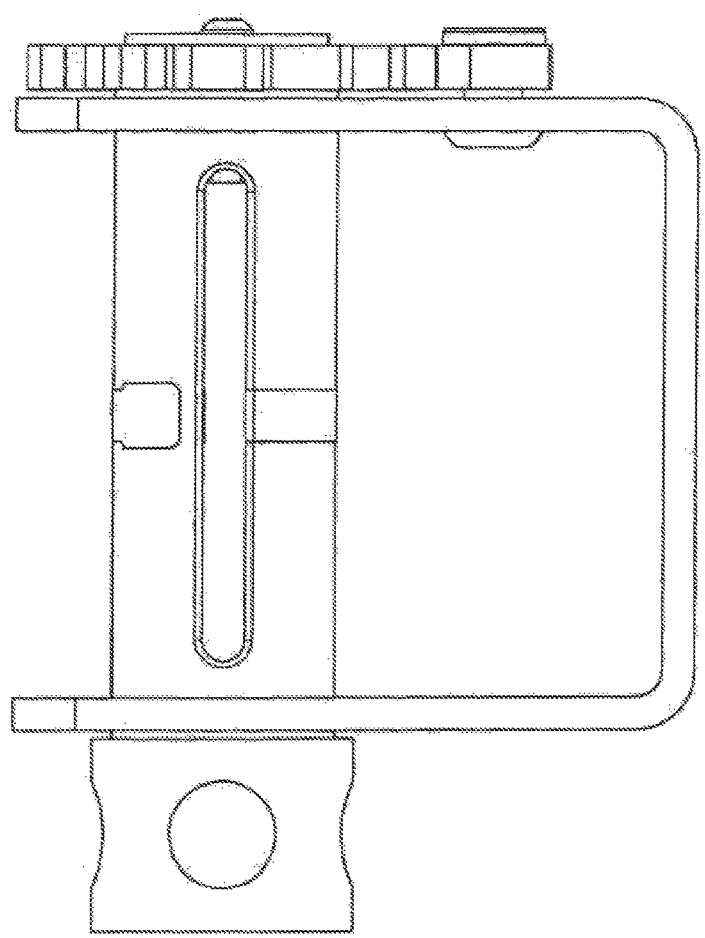
Figure 8E:
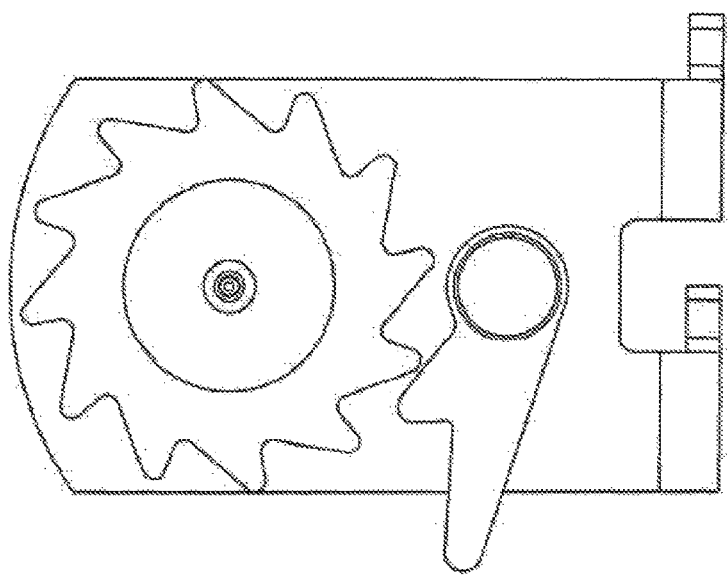
Figure 8G:
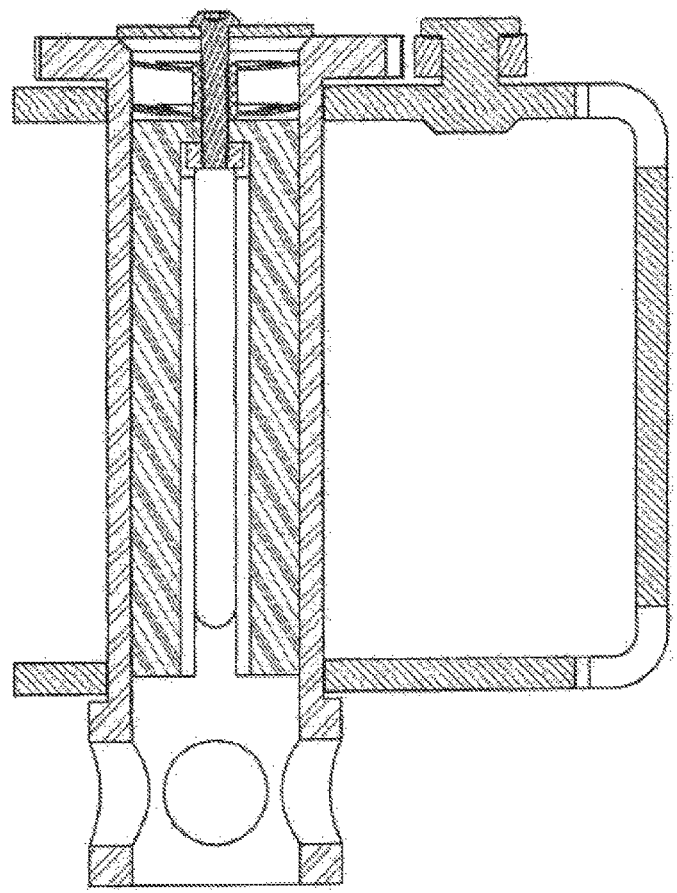
Figure 8H:
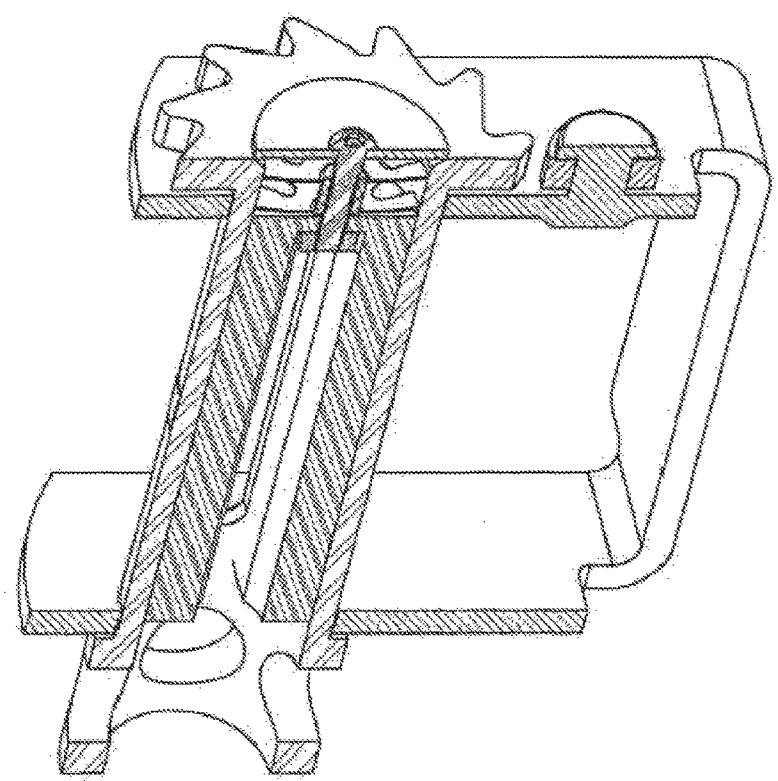

FIGS. 8A, 8B, 8C, 8D, 8E, 8F, 8G, and 8H illustrate several mechanical views of the cargo strap tension warning system according to further aspects of the embodiments. FIG. 8A illustrates an exploded perspective view of the winch assembly with the pin assembly of FIG. 2A (among others), and other connecting and retention apparatus according to an aspect of the embodiments; FIG. 8B illustrates a front view of the assembly of FIG. 2A; FIG. 8C illustrates a top view of the winch assembly of FIG. 8A; FIG. 8D illustrates a rear view of the winch assembly of FIG. 8A; FIG. 8E illustrates a first side view of the winch assembly of FIG. 8A, showing the ratchet assembly; FIG. 8F illustrates a second side view of the winch assembly of FIG. 8A; FIG. 8G illustrates a cross-sectional side view of the winch assembly of FIG. 8A; and FIG. 8H illustrates a cross-sectional perspective view of the winch assembly of FIG. 8A.

According to aspects of the embodiments, the term "report" is intended to cover any means for reporting a cargo strap condition. For example, the report of partial cargo strap failure can be in the form of a wireless communication broadcast to a display terminal in a control/monitoring area. According to a further aspect of the embodiment, the control/monitoring area can be, by way of a non-limiting example, the cab of a flatbed truck, thereby warning the truck driver and/or co-operator of a partial cargo strap condition. The CSMS can be used in boats, ships, and aircraft as well, as well as any other mode of transportation in which cargo needs to be strapped safely in place (e.g., trains, among others). Alternatively, the report can be, for example, in the form of an audible alarm or light indicator. For example, the report of catastrophic cargo strap failure can be in the form of a wireless communication broadcast to a display terminal thereby warning an operator of a partial cargo strap condition. Alternatively, the report can be in the form of an audible alarm or light indicator. According to further aspects of the embodiments, the communication can be made in the form of a wired communication, or a combination of wired and wireless communications. According to a further non-limiting example, one special application wherein a wireless communication system can be used is a tandem trailer configuration. According to still a further aspect of the embodiments, the display assembly can be in the form of a "smart" phone (usable with a special application or "app" as known to those of skill in the art; the app is actually a specially written program to be used on the operating system of the mobile communication device (i.e., "smart" phone)). Display assembly 604 can be a dedicated device used solely for the CSMS (and its different embodiments as described herein), and can include an LCD display, an LED display, or various other types of displays that are now or will be used. According to aspects of the embodiments, an interface device can be used to physically interface with the smart phone to receive communications from sensor assembly 602 in a wired or wireless manner. In general, a tension monitoring and warning algorithm can be stored and run on a controller. The controller can be any known microprocessor integrated circuit including a processor unit and memory that either forms an integral part of the processor and/or in operable communication with the processor. The memory can be random access memory (RAM), or non-volatile memory (NVM). According to further embodiments, read only memory (ROM), erasable programmable ROM (EPROM), and flash memory (e.g., NANO type flash memory) can also be used. In a further aspect of the embodiments, non-volatile memory (NVM) stores operational software code that makes up the TMW algorithm that is read and processed by the controller both to receive tension information from sensor assembly 602, and then the above described application (app) can process and display and/or provide audible information to the operator(s). According to still a further embodiment, display assembly 604 can be integrated into a vehicle's control system that can incorporate different vehicle component control systems such as, for example, a global positioning system (GPS). Such vehicle control systems can include controls for radios and other communication systems, comfort controls, and provide a means to observe vehicle feedback information (e.g., temperatures, pressures and other environmental information), among other feedback systems. These vehicle control systems typically incorporate touch screen displays that allow operators to interface and control the systems of the vehicle in that manner, and/or display different information based on the touch screen interactive display that is currently being displayed. In this case, additional software can be added to the vehicle control system to allow for wired communications, wireless communications (e.g., in the form of Bluetooth communications, or other types), or a combination thereof.

All United States patents and applications, foreign patents, and publications discussed above are hereby incorporated herein by reference in their entireties.

The above illustrations are meant to be illustrative only, and the reader should not consider the embodiments limited merely to those described herein.

We claim:

1. A tension monitoring system for a set of one of more cargo straps on a transportation vehicle, comprising:
    a base, said base including a power source, a computation device, a display, and a control screen, said base configured such that it receives signals;
    a tension monitoring cylinder; said tension monitoring cylinder including a power source, a computational device, a broadcaster, and a tension monitoring strip;
    wherein said tension monitoring strip includes circuitry for detecting tension on a cargo strap while in use; wherein said monitoring strip provides data to said computational device; and
    said computational device sends said data to said base using a wireless protocol; and
    wherein said base indicates on a display when a set of one or more of said cargo straps has met the conditions of a safety threshold, and wherein
    said tension monitoring cylinder is placed into the axle of a winch to be monitored.

2. A system for monitoring a set of one or more cargo straps as recited in claim 1, wherein
    said base provides a display of the status of all straps on said transportation vehicle.

3. A system for monitoring a set of one or more cargo straps as recited in claim 1, wherein
    said tension monitoring cylinder further includes an attachment mechanism which may be tightened or loosened in a receiving cylinder by operating a rotational mechanism at a closed end of said tension monitoring cylinder.

4. A system for monitoring a set of one or more cargo straps as recited in claim 3, wherein
    said rotational mechanism moves said upper and lower portions of said tension monitoring cylinder any one of: further apart or closer together, depending upon the direction that it is moved.

5. A system for monitoring a set of one or more cargo straps as recited in claim 1, wherein
    said display, on said base, displays different colors for a strap that are in different safety parameters.

6. A system for monitoring a set of one or more cargo straps as recited in claim 1, wherein
    said tension monitoring cylinder includes a hex nut that acts to secure said tension monitoring cylinder to the interior of a winch.

7. A system for monitoring a set of one or more cargo straps as recited in claim 1, wherein
    said tension monitoring strip is held together with an adhesive applied by a user.

\* \* \* \* \*